June 6, 1950  F. H. MUELLER  2,510,514
VALVE
Filed May 8, 1946
FIG. 1
FIG. 2
FIG. 4
FIG. 3
FIG. 5
Inventor
Frank H. Mueller
By Cushman Darby & Cushman
Attorney
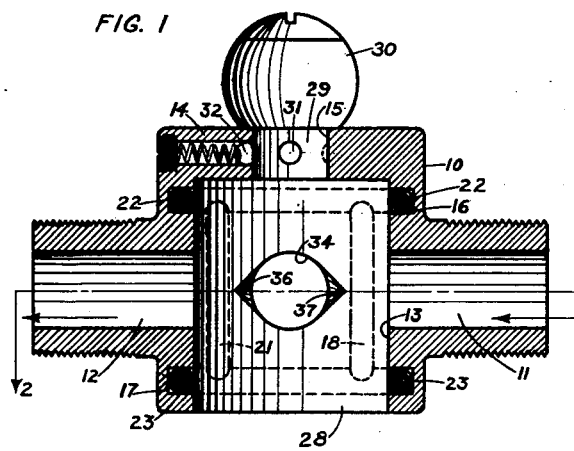
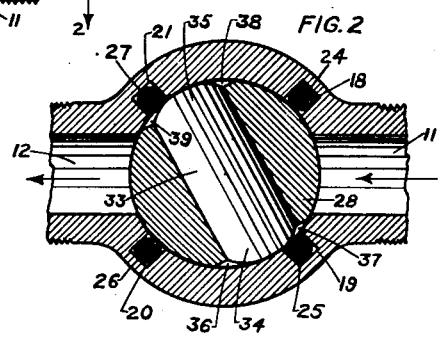
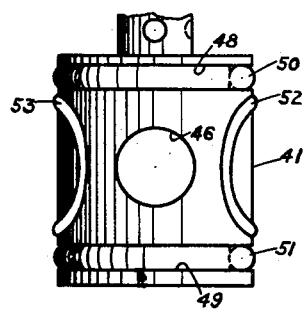
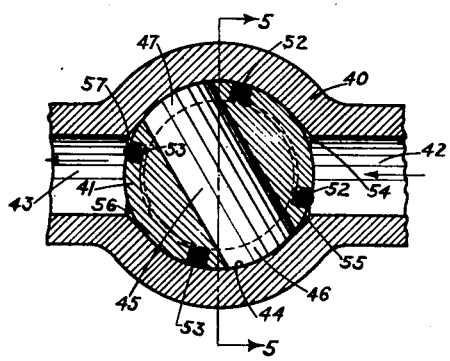
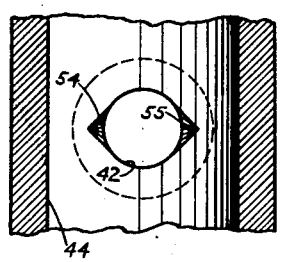

Patented June 6, 1950

2,510,514

UNITED STATES PATENT OFFICE 2,510,514

VALVE

Frank H. Mueller, Decatur, Ill., assignor to Mueller Co., Decatur, Ill., a corporation of Illinois Application May 8, 1946, Serial No. 668,223

6 Claims. (Cl. 251—103)

In the case of rotary plug valves equipped with O-rings or equivalent sealing elements, damage to these elements frequently occurs when the plug is being turned from on to off position. Where a sealing element is disposed in a groove in the housing seat surface, the portion of the sealing element at the far side of the housing inlet port, considered with reference to the turning direction of the plug in moving toward off position, tends to become unseated and nipped by the trailing edge of the plug inlet port by reason of a flow of pressure from the housing inlet to the housing outlet in a path which includes the plug passage. Where a sealing element is positioned in a groove in the plug, the portion thereof immediately behind the outlet end of the plug passage tends to be unseated and nipped by the far edge of the housing outlet.

It is the object of the present invention to remove this difficulty by providing at least one port with a mouth which is laterally extended and tapered substantially to a point so that when the plug member is turned toward off position there is a gradually diminishing escape of pressure between the laterally tapered mouth and the portion of the sealing element engaged thereby. Furthermore, the converging edges of the lateral extension engage the sealing element at points whose distance apart as the valve is moved to closed position gradually approaches zero and, consequently, the engaged portion of the sealing element, if at all displaced by the pressure, is gradually pushed back into normal relation without danger of injury.

Embodiments of the invention are shown in the accompanying drawing in which

Figure 1 is an axial section of a valve in accordance with the invention, the valve housing being grooved to receive the sealing element, and the plug being shown in off position, Figure 2 is a section on line 2—2 of Figure 1, the plug being assumed to be moving clockwise toward closed position, Figure 3 is a section taken like that of Figure 2 of a rotary plug valve wherein the plug is equipped with O-rings, Figure 4 is an elevation of the plug of Figure 3, and Figure 5 is a section on line 5—5 of Figure 3 with the plug removed.

Referring to Figures 1 and 2, reference numeral 10 designates a housing having coaxial inlet and outlet ports 11 and 12 of circular section, these ports intersecting a seat 13 of circular section, here shown as cylindrical. The housing includes a top wall 14 provided with a bore 15 which is coaxial with the seat.

Above the ports the seat is provided with an annular groove 16 and below the ports with a similar groove 17. Axially extending grooves 18 and 19 connect grooves 16 and 17 at the sides of the inlet port and axially extending grooves 20 and 21 connect grooves 16 and 17 at the sides of the outlet port. Disposed in the grooves is a rubber sealing unit comprising annular portions 22 and 23 in grooves 16 and 17 and connecting portions 24, 25, 26 and 27 in grooves 18 to 21 respectively. Portions 24 and 25, together with the connecting portions of elements 22 and 23 provide an endless sealing contact with the plug 28 around the housing inlet port and the housing outlet port is similarly surrounded.

The plug 28 comprises a cylindrical portion mating with the seat and provided with an operating stem 29 which projects through bore 15 and has a handle, whose hub appears at 30, secured thereto. The neck is provided with four equally spaced indentations 31 engageable by a spring-pressed ball 32 for the purpose of yieldingly holding the plug in on or off position. The plug has a diametrical passage 33 of circular cross section, the passage including inlet and outlet ports 34 and 35. The mouth of port 34 is laterally extended at both sides in the form of grooves 36 and 37 which taper symmetrically to points which lie in the common axial plane of all of the ports, i. e. a plane which includes the port axes and is perpendicular to the plug axis. The grooves are of generally V section decreasing in depth as well as width outwardly to their extremities. The width of the grooves is here considered to be their dimension axially of the plug and their depth the dimension generally radially of the plug.

In Figure 2, portion 25 of the sealing element is being engaged by the edges of groove 37 and as the closing movement of the plug clockwise is continued it will be evident that there will be an escape through the groove which diminishes rather gradually to zero instead of being abrupt as would be the case if the mouth of the port were circular. Due to this gradually diminishing escape, any sudden unseating effect on portion 25 is avoided and the converging walls of the groove act to ease the engaged portion of the sealing element back into the groove, if there has been any displacement, and any pinching is impossible particularly in the absence of sharp edges. In addition to the bevel effect of the grooves, their edges may be chamferred if desired.

Such chamferring would be necessary if the elements of the opposite side walls of the grooves were parallel, or substantially so, instead of being in V relation as here shown.

As here shown, the mouth of port 35 is laterally extended at 38 and 39 in the same manner as port 34. Consequently, while ports 11 and 34 have been spoken of as inlet ports and ports 12 and 35 as outlet ports, it will be evident that the valve may be set in the line in either direction.

On the other, if the valve were to be moved only 90° between on and off positions with port 11 being the inlet, it would, for example, be necessary to provide only a single lateral extension, e. g. extension 37. With two extensions, 36 and 37, as shown, the plug can be turned in either direction from on to off, and if turned counter-clockwise the groove 36 would coact with portion 24 of the sealing element in the same manner groove 37 coacts with portion 25 when the plug is turned clockwise.

While I have shown a packing harness like that disclosed in the copending application of Lucien W. Mueller, Serial No. 591,915, filed May 4, 1945, it will be evident that the usual O-rings could be used, one surrounding each of the housing ports.

In Figures 3 to 5, the housing 40 is the same as in the preceding figures except that it is not grooved for the reception of the sealing means, the latter, in this case, being applied to the plug 41. The housing comprises coaxial inlet and outlet ports 42 and 43 of circular section intersecting a cylindrical seat 44. The plug has a passage 45 of circular section and includes inlet and outlet ports 46 and 47. The plug is provided with annular top and bottom grooves 48 and 49 receiving O-rings 50 and 51 and with annular lateral grooves receiving O-rings 52 and 53 which, in the closed position of the plug, surround ports 42 and 43 respectively. The mouth of port 42 has lateral extensions 54 and 55 which taper symmetrically outwardly substantially to points and are of diminishing generally V section outwardly to the said points, being like the extensions heretofore described except that they are formed in the housing. The mouth of port 43 has similar lateral extensions 56 and 57.

With the plug being turned clockwise, Figure 3, the difficulty hereinbefore referred to would ordinarily occur between the portion of O-ring 53 just behind port 47 and the far side of port 43, but due to the provision of the groove 57 the difficulty is eliminated in the same manner as described in connection with the first embodiment. If the plug were only to be turned back and forth through 90° between off and on, the single extension 57 would suffice but with the four extensions, the plug can be turned in any direction between positions and can be set in the line for flow in either direction.

It will be understood that the disclosure herein is intended as illustrative and that variations in the form and arrangement of parts beyond those disclosed are contemplated under the claims which follow.

I claim:

1. A valve comprising a housing member having circular inlet and outlet ports and a seat of circular cross-section intersected by said ports, a rotary plug member in said seat having a passage including circular inlet and outlet ports registrable with the housing member ports, means for turning the plug between on and off positions, said seat and plug member having opposed surfaces, one of said surfaces having a continuous groove which in the off position of the plug surrounds a port of one of said members and is opposed to the surface of the other of said members, an endless rubber sealing element in said groove cooperating with the surface of said other member to provide a seal between the seat and plug member, the mouth of one of the ports of said other member being laterally extended and tapered substantially to a point so that when said plug member is turned toward off position there is a gradually diminishing escape between said laterally tapered mouth and the portion of the sealing element engaged thereby.

2. A valve according to claim 1 wherein the laterally tapered mouth is in the form of a groove of generally V-section which decreases in depth as well as width outwardly to said point.

3. A valve according to claim 1 wherein the groove is in the seat surface around the housing member inlet port and the laterally tapered mouth extends from that side of the plug member inlet port which trails as the plug is moved toward closed position.

4. A valve according to claim 1 wherein the groove is in the seat surface around the housing member inlet and the laterally tapered mouth is in the form of a groove of generally V-section which decreases in depth as well as width outwardly to said point and extends from that side of the plug member inlet port which trails as the plug moves to closed position.

5. A valve according to claim 1 wherein the groove is in the surface of the plug member and the laterally tapered mouth extends from the far side, with reference to the turning direction of the plug in moving toward off position, of the housing member outlet port.

6. A valve according to claim 1 wherein the groove is in the surface of the plug member and the laterally tapered mouth is in the form of a groove of generally V-section which decreases in depth as well as width outwardly to said point and extends from the far side, with reference to the turning direction of the plug in moving toward off position, of the housing member outlet port.

FRANK H. MUELLER.

REFERENCES CITED

The following references are of record in the file of this patent:

UNITED STATES PATENTS

| Number | Name | Date |
| --- | --- | --- |
| 2,210,335 | Mueller | Aug. 6, 1940 |
| 2,383,983 | Melichar | Sept. 4, 1945 |
| 2,392,319 | Harwood | Jan. 8, 1946 |